United States Patent [19]
Tanabe

[11] Patent Number: 5,256,478
[45] Date of Patent: Oct. 26, 1993

[54] CORK CHIP MOULDING

[75] Inventor: Kazuo Tanabe, Gifu, Japan

[73] Assignee: Ikeda Bussan Co., Ltd., Ayase, Japan

[21] Appl. No.: 852,568

[22] Filed: Mar. 17, 1992

[30] Foreign Application Priority Data

Mar. 29, 1991 [JP] Japan ................ 3-28371[U]

[51] Int. Cl.$^5$ ................................. B32B 9/00
[52] U.S. Cl. ................... 524/16; 428/411.1; 428/489; 428/455; 428/326
[58] Field of Search ........... 428/326, 411.1, 423.1, 428/489, 455, 492; 260/9, 54; 264/45, 46

[56] References Cited

U.S. PATENT DOCUMENTS

| 2,584,959 | 9/1948 | Yocom et al. | 428/326 |
| 3,416,244 | 12/1968 | Radcliffe et al. | 36/30 |
| 3,821,135 | 6/1974 | King | 428/326 |

FOREIGN PATENT DOCUMENTS

| 0272856 | 12/1987 | European Pat. Off. |
| 1583895 | 12/1969 | France |
| 51-086583 | 7/1976 | Japan |
| 58-479 | 1/1983 | Japan |
| 666485 | 7/1988 | Switzerland |

Primary Examiner—Patrick J. Ryan
Assistant Examiner—Abraham Bahta
Attorney, Agent, or Firm—Foley & Lardner

[57] ABSTRACT

A cork chip moulding includes a mixture of cork chips and a viscoelastic material, which mixture is dispersed in or bound with a polyurethane. The cork chip moulding is superior in sound and heat insulations, and in rigidity.

16 Claims, 1 Drawing Sheet

CORK CHIP MOULDING

BACKGROUND OF THE INVENTION

1. Field of the Invention

The present invention relates to a so-called cork chip moulding which is used as, for example, an insulator of an automobile dash board or of an automobile floor trim.

2. Description of the Prior Art

There is a proposal to use a so-called polyurethane chip lo moulding as the insulator for the above uses. The polyurethane chip moulding is made by mixing polyurethane foam chips with urethane prepolymer, and by curing the urethane prepolymer. The urethane prepolymer is transformed into polyurethane through this cure. In this moulding as a final product, the polyurethane foam chips are dispersed in or bound with the polyurethane. However, the thus obtained polyurethane chip moulding has the following drawbacks.

It is insufficient in sound insulation and in rigidity. Furthermore, it has a hygroscopic property, so that it tends to be deformed under a high temperature and high humidity condition.

There is another proposal to use a polyvinyl chloride sheet as the insulator of the dash board. This sheet is adhered to a substrate of the dash board. However, this sheet has the following drawbacks.

It is too heavy in weight and inferior in adhesion. Furthermore, there is a problem that a gap tends to be produced between the sheet and the substrate due to creep in the sheet under a certain condition.

SUMMARY OF THE INVENTION

It is therefore an object of the present invention to provide a cork chip moulding which is rigid, light in weight, and superior in sound and heat insulations.

It is another object of the present invention to provide a cork chip moulding which does not have a hygroscopic property and does not easily have creep therein.

According to the present invention, there is provided a cork chip moulding including: cork chips; a viscoelastic material mixed with the cork chips; and a polyurethane mixed with a mixture of the cork chips and the viscoelastic material, the mixture being dispersed in the polyurethane.

DESCRIPTION OF THE PREFERRED EMBODIMENTS

According to the present invention, the cork chip moulding is produced by the following steps in the sequence: mixing cork chips with a viscoelastic material to produce a preparatory mixture; mixing urethane prepolymer with the preparatory mixture to produce a final mixture; filling a certain mould with the final mixture, and curing the urethane prepolymer by means of steam cure. Urethane prepolymer is transformed into polyurethane through this cure. Thus, the cork chip moulding as a final product comprises a mixture of cork chips and a viscoelastic material, which mixture is dispersed or bound with the polyurethane.

Cork chips as a raw material for the cork chip moulding are superior in heat resistance and in rigidity, and do not have a hygroscopic property. Therefore, the cork chip moulding is not deformed even under a certain high temperature and high humidity condition. Furthermore, cork chips are very light in weight, and superior in sound and heat insulations due to their high porosity.

The viscoelastic material provides the cork chip moulding with viscoelasticity. As the viscoelastic material, for example, asphalt, pitch, liquid rubber, terpene dimer, or acrylic oligomer is used.

Urethane prepolymer is prepared by the reaction of polyether or polyester which has hydroxyl groups at two ends of hits molecule with a diisocyanate such as tolylene diisocyanate, hexamethylene diisocyanate, or methylene diphenyldiisocyanate. By this reaction, urethane prepolymer has isocyanate groups at two ends of its molecule.

To produce the preparatory mixture of cork chips and the viscoelastic material, the mixing ratio, by weight, of cork chips to the viscoelastic material is usually from 9:1 to 5:5, preferably from 8:2 to 6:4. The urethane prepolymer in the amount of 10 to 50 wt %, preferably 15 to 35 wt % is mixed with the preparatory mixture to produce the final mixture. In addition to cork chips, if desired, the preparatory mixture may be mixed with plastic chips, plastic foam chips, fiber chips, or the like.

Figure 1:
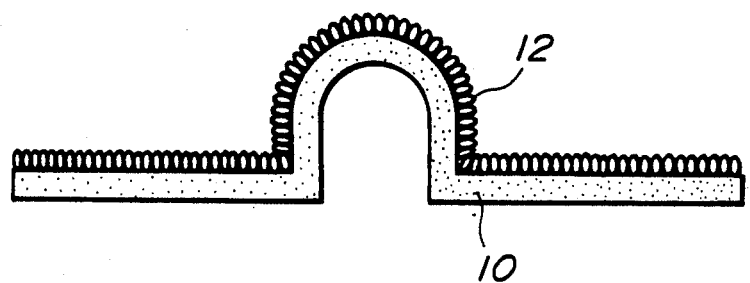
FIG. 1 is an elevational and sectional view showing a carpet, and an insulator which is a cork chip moulding according to the present invention.

The thus obtained cork chip moulding lends itself to many uses. For example, as shown in FIG. 1, it is useful as an insulator 10 of an automobile floor carpet 12. The insulator 10 is adhered to the carpet 12 which has been shaped, by means of a hot-melt sheet such as a polyethylene sheet or a polyamide sheet or a suitable adhesive. However, if desired, the carpet 12 may be shaped at the same time when the insulator 10 is adhered to the carpet 12.

Figure 2:
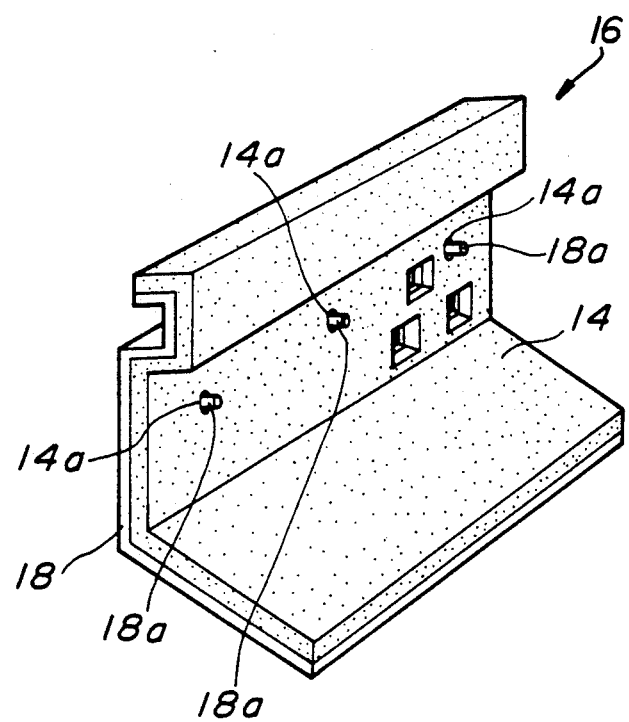
FIG. 2 is a perspective view of an automobile dash board having an insulator which is the cork chip moulding.

As another use of the cork chip moulding, it can be applied to an insulator 14 of an automobile dash board 16, as is shown in FIG. 2. Designated by numeral 18 is a substrate of the dash board 16, which is made of steel. The insulator 14 has three through holes 14a for receiving therethrough three projections 18a of the substrate 18, thereby fixing the insulator 14 on the substrate 18.

The advantages of the present invention will be described in the following.

The cork chip moulding is light in weight, superior in adhesion due to the provision of the viscoelastic material, and superior in sound and heat insulations due to high porosity of the cork chips. Furthermore, the cork chip moulding is superior in rigidity and does not have an undesirable hygroscopic property. Creep is not produced in the cork chip moulding even under a certain high temperature and high humidity condition. Thus, the shape of the cork chip moulding is not deformed even under such condition.

In addition to the above-mentioned uses of the cork chip moulding, if desired, it may be laminated with a polyvinyl chloride sheet, a resin board, a corrugated cardboard sheet, polystyrene foam panel, or the like for the purpose of reinforcement, sound and heat insulations, stabilization of shape, or the like.

What is claimed is:

1. A cork chip moulding comprising:
   cork chips;

a polyurethane mixed with a mixture of said asphalt and said cork chips, the mixture being dispersed in said polyurethane.

2. A cork chip moulding according to claim 1, wherein the ratio by weight between said cork chips and said asphalt is from 9:1 to 5:5.

3. A cork chip moulding according to claim 2, wherein the ratio by weight between said cork chips and said asphalt is from 8:2 to 6:4.

4. A cork chip moulding according to claim 1, further comprising chips selected from the group consisting of plastic chips, plastic foam chips and fiber chips.

5. A cork chip moulding comprising:
cork chips;
pitch mixed with said cork chips; and
a polyurethane mixed with a mixture of said cork chips and said pitch, the mixture being dispersed in said polyurethane.

6. A cork chip moulding according to claim 5, wherein the ratio by weight between said cork chips and said pitch is from 9:1 to 5:5.

7. A cork chip moulding according to claim 6, wherein the ratio by weight between said cork chips and said pitch is from 8:2 to 6:4.

8. A cork chip moulding according to claim 5, further comprising chips selected from the group consisting of plastic chips, plastic foam chips and fiber chips.

9. A cork chip moulding comprising:
cork chips;
terpene dimer mixed with said cork chips; and
a polyurethane mixed with a mixture of said terpene dimer and cork chips, the mixture being dispersed in said polyurethane.

10. A cork chip moulding according to claim 9, wherein the ratio by weight between said cork chips and said terpene dimer is from 9:1 to 5:5.

11. A cork chip moulding according to claim 10, wherein the ratio by weight between said cork chips and said terpene dimer is from 8:2 to 6:4.

12. A cork chip moulding according to claim 9, further comprising chips selected from the group consisting of plastic chips, plastic foam chips and fiber chips.

13. A cork chip moulding comprising:
cork chips;
acrylic oligomer mixed with said cork chips; and
a polyurethane mixed with a mixture of said acrylic oligomer and cork chips, the mixture begin dispersed in said polyurethane.

14. A cork chip moulding according to claim 13, wherein the ratio by weight between said cork chips and said acrylic oligomer is from 9:1 to 5:5.

15. A cork chip moulding according to claim 14, wherein the ratio by weight between said cork chips and said acrylic oligomer is from 8:2 to 6:4.

16. A cork chip moulding according to claim 13, further comprising chips selected from the group consisting of plastic chips, plastic foam chips and fiber chips.

* * * * *